United States Patent
Wang et al.

(10) Patent No.: US 11,543,880 B2
(45) Date of Patent: Jan. 3, 2023

(54) MOTION DEVICE FOR VIRTUAL REALITY INTERACTION AND VIRTUAL REALITY SYSTEM

(71) Applicants: BEIJING BOE DISPLAY TECHNOLOGY CO., LTD., Beijing (CN); BOE TECHNOLOGY GROUP CO., LTD., Beijing (CN)

(72) Inventors: Jing Wang, Beijing (CN); Peng Li, Beijing (CN)

(73) Assignees: BEIJING BOE DISPLAY TECHNOLOGY CO., LTD., Beijing (CN); BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 267 days.

(21) Appl. No.: 16/917,531

(22) Filed: Jun. 30, 2020

(65) Prior Publication Data

US 2021/0034143 A1 Feb. 4, 2021

(30) Foreign Application Priority Data

Jul. 29, 2019 (CN) .......................... 201910688659.3

(51) Int. Cl.
- *G06F 3/01* (2006.01)
- *A63B 22/02* (2006.01)
- *A63B 71/06* (2006.01)

(52) U.S. Cl.
CPC .............. *G06F 3/011* (2013.01); *A63B 22/02* (2013.01); *A63B 22/0285* (2013.01);
(Continued)

(58) Field of Classification Search
CPC ........ A63B 2022/0271; A63B 22/0285; G06F 3/011; G06F 2203/012
See application file for complete search history.

(56) References Cited

U.S. PATENT DOCUMENTS

| 2004/0048722 A1* | 3/2004 | Epstein .................. G06F 3/011 482/54 |
| 2013/0132910 A1* | 5/2013 | Belmon .............. G06F 3/04815 715/850 |

(Continued)

FOREIGN PATENT DOCUMENTS

| CN | 101288798 A | 10/2008 |
| CN | 106110573 A | 11/2016 |

(Continued)

OTHER PUBLICATIONS

Office Action received for Chinese Patent Application No. 201910688659.3, dated Aug. 14, 2020, 10 pages (4 pages of English Translation and 6 pages of Office Action).

*Primary Examiner* — Jennifer Robertson
(74) *Attorney, Agent, or Firm* — Womble Bond Dickinson (US) LLP (57) ABSTRACT

A motion device for a virtual reality interaction includes a core, a running belt carried by the core and a frame. The running belt is configured to wrap the core and capable of sliding on the outer surface of the core. The running belt includes a number of running belt units. A surface of each running belt unit facing the core is provided with a number of grooves, and each groove of each running belt unit is connected with a corresponding groove of an adjacent running belt unit through an elastic strap. The frame is located at a periphery of the running belt and is configured to carry the running belt and the core. A number of first balls are arranged between the frame and the running belt.

18 Claims, 5 Drawing Sheets

(52) U.S. Cl.
CPC .. *A63B 71/0622* (2013.01); *A63B 2022/0271* (2013.01); *A63B 2071/065* (2013.01); *A63B 2071/0638* (2013.01); *A63B 2071/0644* (2013.01); *A63B 2220/20* (2013.01); *A63B 2220/30* (2013.01); *A63B 2220/40* (2013.01); *A63B 2220/56* (2013.01); *A63B 2220/833* (2013.01); *G06F 2203/012* (2013.01)

(56) References Cited

U.S. PATENT DOCUMENTS

2015/0321337 A1* 11/2015 Stephens, Jr. ...... A63B 22/0285
                                                                                                       901/1
2019/0134457 A1* 5/2019 Chen ...................... A63B 22/02

FOREIGN PATENT DOCUMENTS

| CN | 206451388 U | 8/2017 | |
|---|---|---|---|
| CN | 108499021 A | 9/2018 | |
| CN | 109078295 A | 12/2018 | |
| CN | 110013644 A | 7/2019 | |
| KR | 2013-0054853 A | 5/2013 | |
| KR | 20210023190 A * | 3/2021 | ......... A63B 22/0023 |
| WO | 2016/120793 A1 | 8/2016 | |

\* cited by examiner

MOTION DEVICE FOR VIRTUAL REALITY INTERACTION AND VIRTUAL REALITY SYSTEM

CROSS REFERENCE TO RELATED APPLICATIONS

The present application claims the benefit of a Chinese Patent Application No. 201910688659.3, filed on Jul. 29, 2019, the contents of which are incorporated herein by reference in their entireties.

TECHNICAL FIELD

The present application relates to the field of virtual reality, in particular to a motion device for virtual reality interaction and a virtual reality system.

BACKGROUND

Virtual reality technology is a kind of computer simulation technology that can create and experience a virtual world. By generating an interactive three-dimensional dynamic visual scene with a computer, users can immerse themselves in a virtual environment and dual experience of hearing and touch can be realized.

At present, when a virtual reality motion device realizes interaction between virtuality and reality through motions of lower limbs of a user, the user's experience through the mode of realizing the interaction between the virtuality and the reality is very poor due to limited motion range of the lower limbs of the user. Currently, virtual reality motion devices capable of realizing omni-directional motion experiences are generally complex in structure and poor in practical operability.

SUMMARY

In view of this, some exemplary embodiments of the present application propose a motion device for virtual reality interaction, including:

a core;

a running belt carried by the core, the running belt configured to wrap the core and capable of sliding on the outer surface of the core, wherein the running belt comprises a plurality of running belt units, a surface of each running belt unit facing the core is provided with a plurality of grooves, and each groove of each running belt unit is connected with a corresponding groove of an adjacent running belt unit through an elastic strap; and a frame located at a periphery of the running belt and configured to carry the running belt and the core, wherein a plurality of first balls are arranged between the frame and the running belt.

According to an aspect of the present disclosure, the outer surface of the core is provided with a plurality of sockets, and a second ball is arranged in each socket.

According to an aspect of the present disclosure, a cross section of the running belt unit is hexagonal, and a corresponding groove is provided along a perpendicular bisector of each side of the hexagon.

According to an aspect of the present disclosure, the running belt is an omni-directional running belt and comprises adjacent first and second running belt units, the first running belt unit has a first stop wall and a first groove, the first groove has a first slide rail, the second running belt unit has a second stop wall and a second groove, the second groove has a second slide rail, the elastic strap has a first T-shaped end and a second T-shaped end, the first T-shaped end is configured to slide in the first slide rail and stop at the first stop wall, and the second T-shaped end is configured to slide in the second slide rail and stop at the second stop wall.

According to an aspect of the present disclosure, the core is substantially ellipsoidal, and the ellipsoid has two opposite substantially planar main surfaces and an arc surface connecting the two main surfaces.

According to an aspect of the present disclosure, the core is made of rigid material, each running belt unit is made of a light metal material, the elastic strap is a metal elastic strap, and the first balls and the second balls are both metal balls.

According to an aspect of the present disclosure, as to the plurality of sockets, connecting lines between centers of adjacent three sockets take on an equilateral triangular shape.

According to an aspect of the present disclosure, the socket has a spherical segment shape, and a height of the spherical segment is 4/5 of a height of the sphere.

According to an aspect of the present disclosure, the frame is provided with a brush adjacent to an outer periphery of the main surface.

According to an aspect of the present disclosure, the surface of each running belt unit facing the core is further provided with a pressure sensor.

According to an aspect of the present disclosure, the frame comprises an oil supply pipeline and an oil supply head arranged therein, the oil supply pipeline is connected with an oil source, and the oil supply head is configured to supply oil to the socket through a gap when the gap occurs between two adjacent running belt units. For example, the oil supply head includes an oil brush to brush oil toward the socket and the second ball.

Some exemplary embodiments of the present application also provide a virtual reality system, including:

a virtual reality device including a receiver and a processor; and a motion device for virtual reality interaction comprises:

a core;

a running belt carried by the core, the running belt configured to wrap the core and capable of sliding on the outer surface of the core, wherein the running belt comprises a plurality of running belt units, a surface of each running belt unit facing the core is provided with a plurality of grooves, each groove of each running belt unit is connected with a corresponding groove of an adjacent running belt unit through an elastic strap, and the surface of each running belt unit facing the core is further provided with a pressure sensor;

a frame located at a periphery of the running belt and configured to carry the running belt and the core, wherein a plurality of first balls are arranged between the frame and the running belt; and a transmitter configured to transmit motion data of a user on the running belt to the receiver of the virtual reality device, wherein the processor is configured to establish a two-dimensional coordinate system according to the pressure sensor distribution of the running belt, and combine the two-dimensional coordinate system with a virtual scene to create a three-dimensional real-time coordinate system.

According to an aspect of the present disclosure, the processor is further configured to: initialize the three-dimensional real-time coordinate system according to an initial barycenter coordinate of the user on the running belt and the virtual scene, wherein the three-dimensional real-time coordinate system comprises a correspondence relationship between actual coordinates and scene coordinates; and update the correspondence according to the movement of the user.

According to an aspect of the present disclosure, the processor is further configured to: determine actual coordinates of starting points and falling points of the user's feet according to pressure changes received by the pressure sensors corresponding to the barycenter coordinates of the user's feet when the user walks; determine a walking distance of the user in the virtual scene according to the actual coordinates of the starting points and the falling points of the user's feet and the correspondence relationship between the actual coordinates and the scene coordinates; and determine a walking speed of the user in the virtual scene according to a time interval between the starting point and the falling point and the walking distance.

According to an aspect of the present disclosure, the processor is further configured to: determine an initial acceleration according to the pressure changes received by the pressure sensors corresponding to the barycenter coordinates of the user's feet and a weight of the user when the user jumps; determine a jumping height of the user according to a time interval between two adjacent landings of the user and the initial acceleration; determine a horizontal displacement of the user according to the barycenter coordinates of the user's feet before leaving the ground and the barycenter coordinates of the user's feet after landing.

According to an aspect of the present disclosure, the processor is further configured to adjust the walking distance or the horizontal displacement according to an error adjustment parameter.

According to an aspect of the present disclosure, the motion device for virtual reality interaction is configured to: sense the user's motion through the pressure sensors of the running belt and generates motion data; transmit the motion data of the user to the receiver of the virtual reality device through the transmitter; wherein the virtual reality device is configured to: process the user motion data received by the receiver through the processor; display a virtual scene image; and adjust the virtual scene image according to the motion data processing by the processor.

According to an aspect of the present disclosure, the motion data includes at least one of walking distance, walking speed, walking direction, jumping height, initial acceleration, and horizontal displacement of the user in the virtual scene.

Additional aspects and advantages of the present application will be set forth in part in the following description, and in part will be apparent from the following description, or may be learned by practice of the application.

BRIEF DESCRIPTION OF THE DRAWINGS

The above and/or additional aspects and advantages of the present application will become apparent and readily understood from the following description of some exemplary embodiments taken in conjunction with the accompanying drawings, in which.

DETAILED DESCRIPTION

Some exemplary embodiments of the present application are described in detail below, examples of which are illustrated in the accompanying drawings, wherein the same or similar reference numerals refer to the same or similar elements or elements having the same or similar functions throughout. The embodiments described below by referring to the drawings are exemplary and are intended to explain the present application and should not be construed as limiting the application.

At present, when a virtual reality motion device realizes an interaction between virtuality and reality through motions of lower limbs of a user, the user's experience through the mode of realizing the interaction between the virtuality and the reality is very poor due to limited motion range of the lower limbs of the user. In related art, omni-directional (all-directional, universal) motion experiences are realized through omni-directional wheels with generally complex structures, which is poor in practical operability.

In some exemplary embodiments of the present disclosure, a motion device for virtual reality interaction, hereinafter referred to as a motion device for short, is proposed to solve the technical problems that the virtual reality motion device in the related art has poor user experience due to the limited motion range of the user's lower limbs, and the device capable of realizing motion experience has complex structure and poor actual operability.

First, with reference to FIGS. 1-7, a structure of a motion device for virtual reality interaction according to some exemplary embodiments of the present application will be described.

Figure 1:
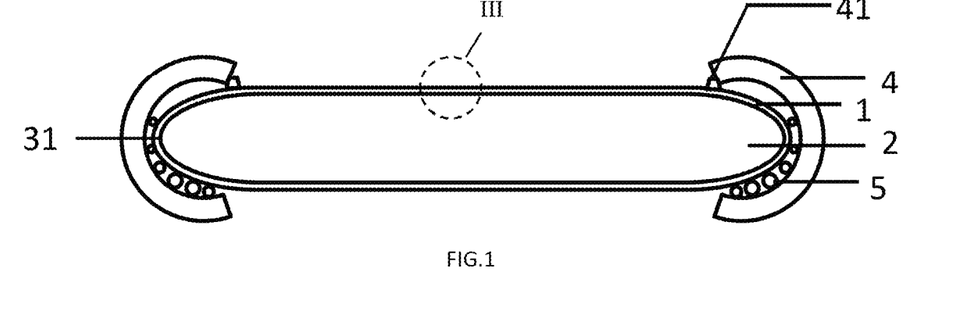
FIG. 1 is a schematic cross-sectional view of a motion device for virtual reality interaction according to some exemplary embodiments of the present application.
Figure 2:
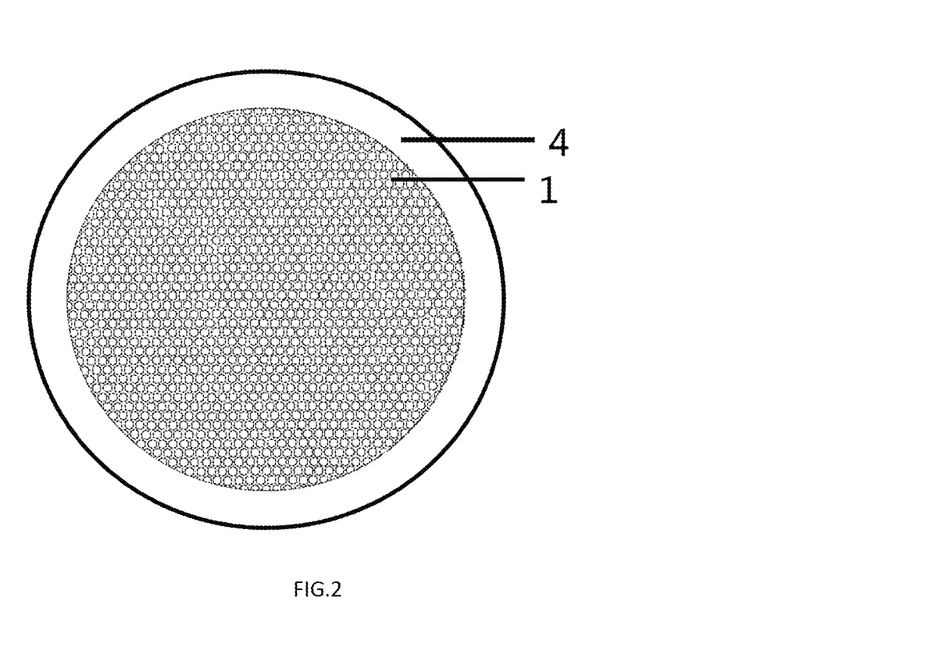
FIG. 2 is a schematic top view of a motion device for virtual reality interaction according to some exemplary embodiments of the present application.
Figure 3:
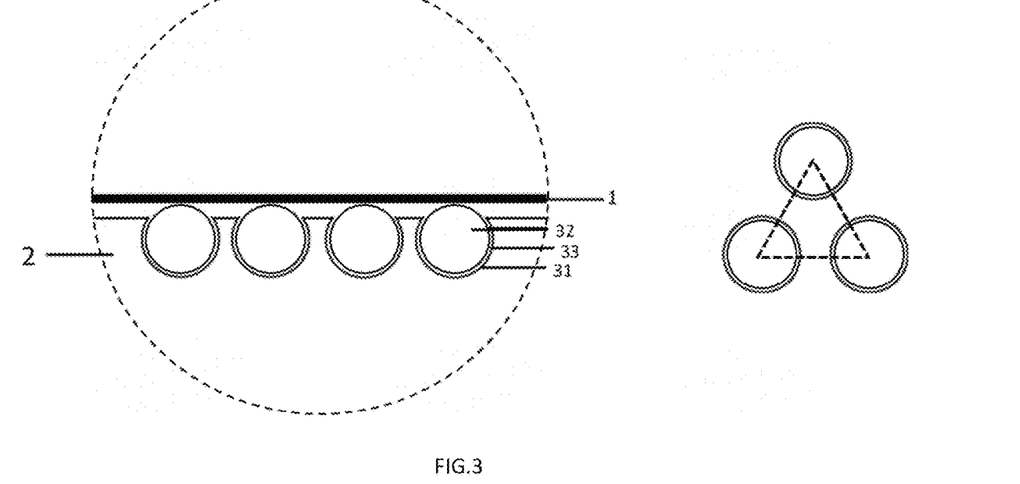
FIG. 3 is an enlarged partial view of III in FIG. 1, schematically showing structures and arrangement of sockets and second balls in a core according to some exemplary embodiments of the present application.
Figure 4:
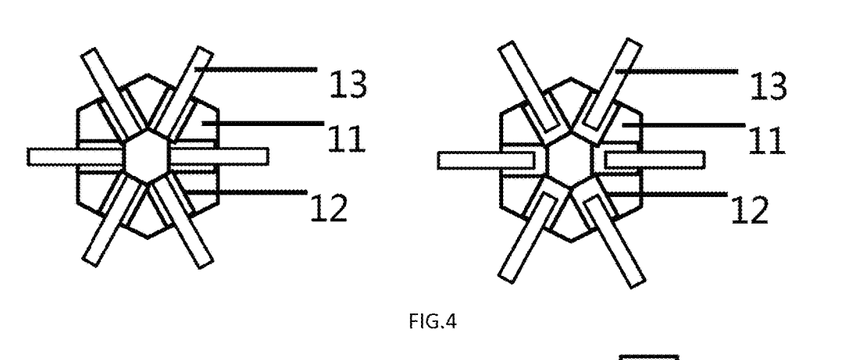
FIG. 4 is a schematic bottom view of a running belt unit in a retracted state and a stretched state according to some exemplary embodiments of the present application.

FIG. 1 is a schematic cross-sectional view of a motion device for virtual reality interaction according to some exemplary embodiments of the present application. FIG. 2 is a schematic top view of a motion device for virtual reality interaction according to some exemplary embodiments of the present application. FIG. 3 is a schematic view showing structures and arrangement of sockets and second balls of a core according to some exemplary embodiments of the present application. FIG. 4 is a bottom view of a running belt unit in a retracted state and a stretched state according to some exemplary embodiments of the present application.

As shown in FIGS. 1-4, the motion device includes a running belt 1, a core 2 supporting the running belt 1, and a frame 4 carrying the running belt 1 and the core 2.

The running belt 1 is configured to wrap the core 2 and capable of sliding on the outer surface of the core 2, wherein the running belt comprises a plurality of running belt units 11, each running belt unit 11 is provided with a plurality of grooves 12 on the surface facing the core 2, and each groove 12 of each running belt unit 11 is connected with a corresponding groove 12 of an adjacent running belt unit 11 through an elastic strap 13. The frame 4 is located at a periphery of the running belt 1 and is configured to carry the running belt 1 and the core 2, wherein a plurality of first balls 5 are arranged between the frame 4 and the running belt 1. Therefore, a user can realize omni-directional movements on the motion device, and the motion device has simple structure, excellent practical operability and improved user experience.

The core 2 is substantially ellipsoidal, and the ellipsoid has two opposite substantially planar main surfaces and an arc surface connecting the two main surfaces. The outer surface of the core 2 is provided with a plurality of sockets 31, and a second ball 32 is arranged in each socket 31. The plurality of sockets 31 are positioned in the surface of the core 2 contacting the omni-directional running belt 1, and a plurality of second balls 32 are respectively arranged in a plurality of sockets 31, so that the user can more smoothly realize omni-directional movements on the motion device. Therefore, the motion device comprising the sockets-balls has a simple structure, excellent practical operability and improved user experience.

As shown in FIG. 2, specifically, the shape of the omni-directional running belt 1 in a top view may be circular. In addition, the running belt unit 11 can be made of ultra-light metal material or other ultra-light material that is less susceptible to wear. The core is made of rigid material or hard material. The elastic strap is a metal elastic strap. The first ball and the second ball are both metal balls. The cross-sectional shape of each running belt unit 11 may be hexagonal, or may be square, circular or any other arbitrary shape, and this application is not limited to this.

In some exemplary embodiments, when the cross-sectional shape of the running belt unit 11 has a hexagonal shape (hereinafter referred to as "the running belt unit is hexagonal" for short), a corresponding groove is provided along a perpendicular bisector of each side of the hexagon. The side length of the hexagon can be arbitrarily set as required. For example, the side length of the running belt unit 11 may be set to be 1 cm or less according to the actual size of the omni-directional running belt 1. It should be noted that in practical application, the side length of the running belt unit 11 when it is hexagonal should not be more than 2 cm.

In addition, the upper surface of the running belt unit 11 may have a sawtooth structure, so that when the user moves on the omni-directional running belt 1, friction between the omni-directional running belt 1 and the user's feet can be increased to prevent the user from slipping. The surface of the running belt unit 11 facing the core may be smooth and coated with lubricating oil, so that friction between the running belt 1 and the core 2 can be reduced when this surface contacts with the second balls 32 on the surface of the core 2.

In some exemplary embodiments, an upper surface and a lower surface of the core 2 may be planar, thereby more conforming to a scene of a user moving on the ground. In addition, the core 2 may be a hard solid substantially in the shape of an ellipsoid, and its material is not limited but needs to have ultra-strong hardness. The surface of the socket 31 of the core 2 is a smooth surface, and the surface of the core 2 other than the sockets 31 may be rougher than the surface of the socket 31. For example, the roughness of the surface of the core 2 other than the sockets 31 is 5 micrometers (um) or less.

As shown in FIG. 3, the plurality of sockets 31 may be arranged in equilateral triangles, that is, connecting lines between centers of three adjacent sockets 31 take on an equilateral triangular shape. The second ball 32 may be made of metal material, and a lubricating oil 33 may be coated between the second ball 32 and the socket 31. The size of the socket 31 in the surface of the core 2, the spacing size between the sockets 31, and the like can be set as required. For example, in some exemplary embodiments of the present application, a diameter of the socket 31 may be set to be less than 0.5 cm, and the spacing between the two adjacent sockets 31 (i.e., a minimum width of the spacing area between the two adjacent sockets) may be set to be less than or equal to 0.25 cm, so that in any case, each running belt unit 11 is supported by at least two second balls 32 to ensure that the edge of the running belt unit 11 is not stuck by the second balls 32. In some exemplary embodiments of the present application, the socket 31 may be an embedded socket, for example, the socket 31 has a spherical segment shape, a height of the spherical segment is ⅘ of a height of the sphere, and a diameter of the second ball 32 in the socket 31 is less than 0.4 cm. The socket 31 and the second ball 32 are respectively formed so that the second ball 32 is embedded in the middle of the socket 31, and there is no obvious relative displacement between the second ball 32 and the socket 31 (i.e., the gap between the two should not be too large), so long as the second ball 32 can rotate smoothly in the socket 31. The omni-directional running belt 1 generates rolling friction through the second balls 32 on the surface of the core 2 and with the help of the lubricating oil 33, the friction force between the omni-directional running belt 1 and the core 2 can be reduced.

In some exemplary embodiments, the elastic strap 13 may be made of metal that can be stretched and retracted quickly. As shown in FIG. 4, the sides of each running belt unit 11 facing the core are provided with grooves 12, each groove 12 is perpendicular to each corresponding side of the running belt unit 11, and the elastic straps 13 are installed in the grooves 12. Two adjacent running belt units 11 share an elastic strap 13, and the length of the elastic strap 13 can be smaller than the distance between two opposite sides of the running belt unit 11.

Figure 5:
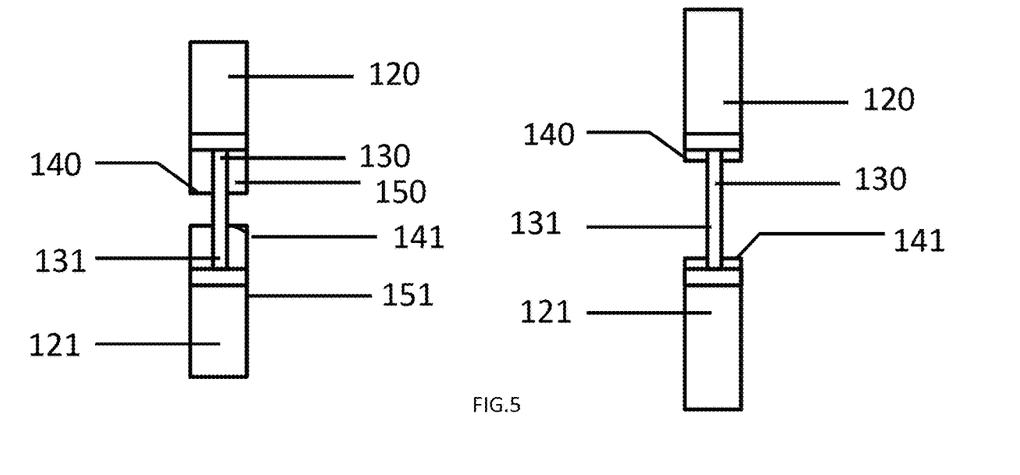
FIG. 5 is a schematic bottom view of a groove and an elastic strap when the running belt unit is in a retracted state and a stretched state according to some exemplary embodiments of the present application.
Figure 6:
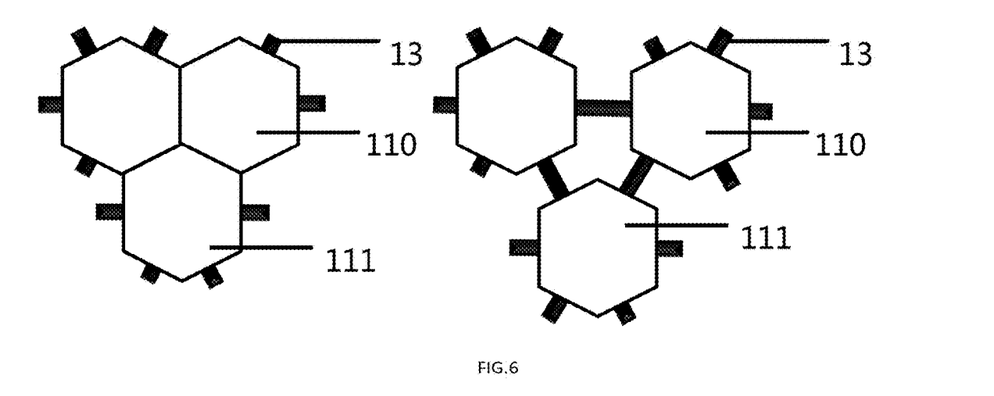
FIG. 6 is a schematic top view of three adjacent running belt units in a retracted state and a stretched state according to some exemplary embodiments of the present application.
Figure 7:
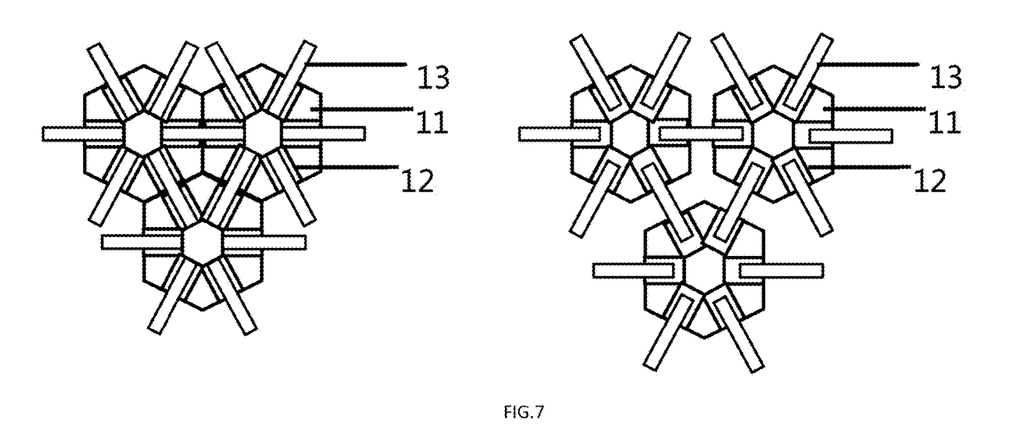
FIG. 7 is a schematic bottom view of three adjacent running belt units in a retracted state and a stretched state according to some exemplary embodiments of the present application.

Further, as shown in FIGS. 5-7, assuming that the first running belt unit 110 and the second running belt unit 111 are two adjacent running belt units in the omni-directional running belt 1, the first running belt unit 110 has a first stop wall 140 and a first groove 120, the first groove 120 has a first slide rail 150; the second running belt unit 111 has a second stop wall 141 and a second groove 121, the second groove 121 has a second slide rail 151. The elastic strap 13 has a first T-shaped end 130 and a second T-shaped end 131.

The first T-shaped end 130 can slide in the first slide rail 150 and stop at the first stop wall 140. The second T-shaped end 131 can slide in the second slide rail 151 and stop at the second stop wall 141.

Specifically, the first stop wall 140 is disposed at the bottom of the first groove 120, the second stop wall 141 is disposed at the bottom of the second groove 121, and both ends of the elastic strap 13 are respectively T-shaped, so that when the omni-directional running belt 1 is in the stretched state, the elastic strap 13 will not break away from the groove due to excessive pulling force.

Further, as shown in FIG. 1, the motion device may further include a frame 4 carrying the omni-directional running belt 1 and the core 2. The plurality of first balls 5 are arranged between the frame 4 and the omni-directional running belt 1. The sizes of the first balls 5 may be different to conform to or follow the size of the spacing between the frame 4 and the running belt 1. The first balls 5 may be sandwiched between the frame 4 and the running belt 1 or may be mounted on the inner surface of the frame 4 so that it can only rotate but not translate relative to the frame 4.

As shown in FIG. 1, the first balls 5 with different sizes are sandwiched between the frame 4 and the omni-directional running belt 1 and can rotate with the movement of the omni-directional running belt 1, thereby assisting the movement of the omni-directional running belt 1 on the surface of the core 2. The frame 4 cooperates with the first balls 5 to support the omni-directional running belt 1 and the core 2.

As shown in FIG. 6, when in a horizontal state, the running belt unit 11 of the omni-directional running belt 1 assumes a retracted state on the upper and lower horizontal planes, and there is no gap between adjacent running belt units 11. The omni-directional running belt 1 is moved by the friction of the user's sole. When the running belt unit 11 moves to the vicinity of the frame 4, the elastic straps 13 between the running belt units 11 are stretched to assist the deformation of the omni-directional running belt 1 with the change of the shape of the core 2, thereby reducing damage to the omni-directional running belt 1. The edge of the core 2 adjacent to the frame 4 may be cambered so as to prevent abrasion of the running belt unit 11 and the elastic strap 13.

In addition, the frame 4 can be set higher than the upper surface of the omni-directional running belt 1, thereby reminding the user of the position of the edge of the omni-directional running belt 1 and preventing the user from falling.

Further, as shown in FIG. 1, the motion device may further include a brush 41 disposed on the frame 4, the brush 41 being adjacent to an outer periphery of the main surface of the core 2. The brush 41 is installed at a gap between the upper frame 4 and the omni-directional running belt 1, so as to prevent foreign matters from entering the gap between the omni-directional running belt 1 and the frame 4 and damaging the motion device.

Further, an oil pipe and an oil brushing device connected to the oil pipe may be provided in the frame 4, so that the lubricating oil can be replenished into the socket 31 in the surface of the core 2 through a gap when the running belt unit 11 is stretched. The oil pipe is connected with an oil source, and the oil brushing device comprises an oil supply head, wherein the oil supply head is configured to supply oil to the socket through the gap when the gap occurs between two adjacent running belt units. For example, the oil supply head includes an oil brush to brush oil toward the socket and the second ball.

Further, in some exemplary embodiments of the present application, the side (or surface) of each running belt unit 11 facing the core is provided with a pressure sensor to sense the pressure of the user's foot when the user moves on the motion device, thereby determining the position of the user's actual (real) foot falling point, and determining a speed, distance, direction, etc. of the user's movement according to the position of the actual foot falling point. According to the speed, distance and direction of the user's movement in reality, the user's position and moving direction in the virtual scene can be determined to achieve better interaction between reality and virtuality. The pressure sensor may be provided in the middle of the running belt unit 11.

Next, with reference to FIGS. 8-11, the process and principle of how the motion device for virtual reality interaction realizes the interaction between virtuality and reality will be explained.

Specifically, some exemplary embodiments of the present application provide a virtual reality system that includes a virtual reality device and a motion device for virtual reality interaction.

The virtual reality device includes a receiver and a processor.

The motion device for virtual reality interaction comprises a core; a running belt carried by the core, the running belt configured to wrap the core and capable of sliding on the outer surface of the core, wherein the running belt comprises a plurality of running belt units, a surface of each running belt unit facing the core is provided with a plurality of grooves, each groove of each running belt unit is connected with a corresponding groove of an adjacent running belt unit through an elastic strap, and the surface of each running belt unit facing the core is further provided with a pressure sensor; a frame located at a periphery of the running belt and configured to carry the running belt and the core, wherein a plurality of first balls are arranged between the frame and the running belt; and a transmitter configured to transmit motion data of a user on the running belt to the receiver of the virtual reality device. The processor is configured to establish a two-dimensional coordinate system according to the pressure sensor distribution of the running belt, and combine the two-dimensional coordinate system with a virtual scene to create a three-dimensional real-time coordinate system.

Of course, the processor is not limited to being provided on the virtual reality device, but may be alternatively or additionally provided on the motion device for virtual reality interaction, and may also be provided outside the virtual reality device and the motion device for virtual reality interaction. The transmitter is not limited to only being provided on the motion device for virtual reality interaction. For example, the virtual reality device may also be provided with a transmitter to send data to the motion device and/or the processor for virtual reality interaction so as to better realize the interaction. The receiver is not limited to only being provided on the virtual reality device. For example, the receiver may also be provided on the motion device for virtual reality interaction to receive data from the virtual reality device so as to better realize interaction.

When the processor is arranged on the motion device for virtual reality interaction, data processing is carried out through the processor on the motion device to realize interaction between virtuality and reality. When the processor is provided on the virtual reality device, data processing is carried out through the processor on the virtual reality device to realize interaction between virtuality and reality. For example, when the virtual reality device is provided with the processor, the motion device for virtual reality interaction is provided with the transmitter, and the virtual reality device is provided with the receiver, the motion device for virtual reality interaction is configured to sense a user's motion through the pressure sensors of the running belt, and generate motion data; transmit the motion data of the user to the receiver of the virtual reality device through the transmitter. The virtual reality device is configured to process the user motion data received by the receiver through the processor; display a virtual scene image; and adjust the virtual scene image according to the result of the motion data processing by the processor.

As an example, each running belt unit 11 of the omni-directional running belt 1 includes a pressure sensor on the surface facing the core, so that a sensor array can be formed on the entire omni-directional running belt 1. In some exemplary embodiments of the present application, a two-dimensional coordinate system may be established according to the sensor distribution in the motion area on the omni-directional running belt 1, and a three-dimensional real-time coordinate system may be created according to the two-dimensional coordinate system and the virtual scene.

Figure 8:
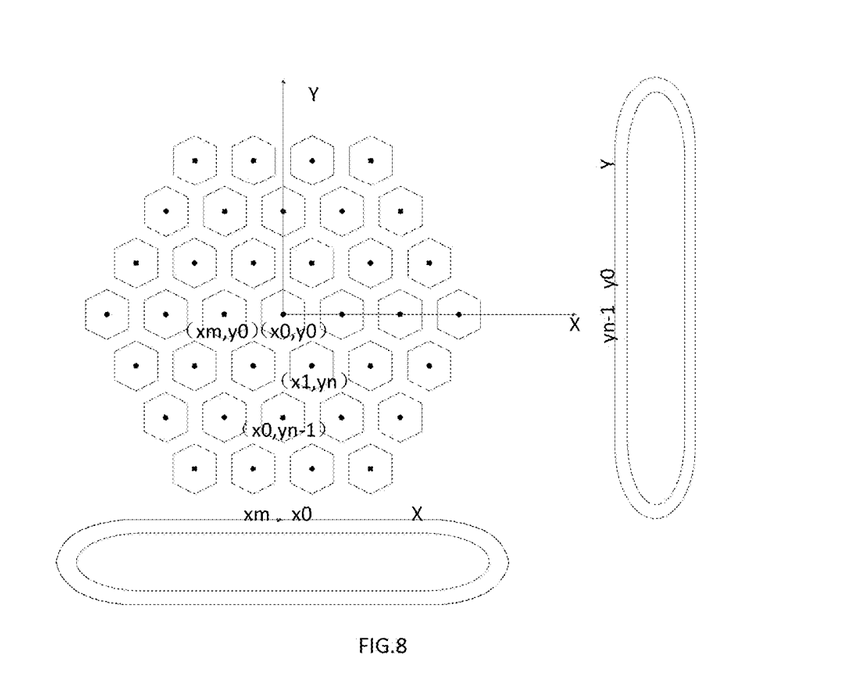
FIG. 8 is a schematic view of a two-dimensional coordinate system of some exemplary embodiments of the application.

Specifically, as shown in FIG. 8, after the motion device is turned on, the processor can mark the sensor closest to the center of the motion area as (x0, y0) according to the sensor distribution in the motion area on the omni-directional running belt 1, and then automatically assign two-dimensional coordinate values (x, y) corresponding to all sensors on the surface of the omni-directional running belt 1 with (x0, y0) as the center point according to the coordinate direction shown in FIG. 8 to establish a two-dimensional coordinate system. Since the surface of the omni-directional running belt 1 is completely closed, the coordinate values corresponding to all sensors can be located in the first quadrant of the two-dimensional coordinate system by curved surface extension of the coordinate system.

In some exemplary embodiments of the present application, assuming that the number of sensors distributed along a single coordinate axis direction is in and n, respectively, the coordinates along the x-axis in the two-dimensional coordinate system may be (x0, y0) . . . (xm−1, y0) sequentially, and the coordinates along the y-axis in the two-dimensional coordinate system may be (x0, y0) . . . (x0, yn−1) sequentially. In this way, initial coordinate values in the two-dimensional coordinate system can be obtained.

Figure 9:
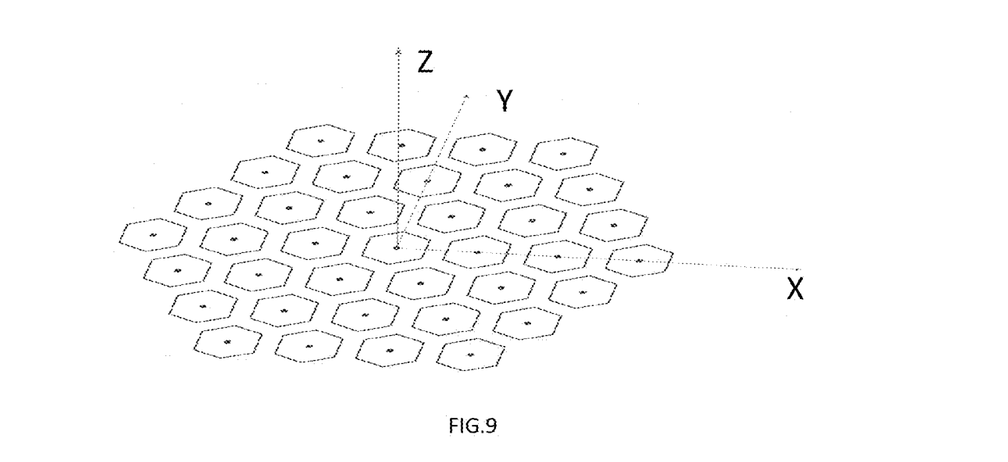
FIG. 9 is a schematic view of a three-dimensional real-time coordinate system according to some exemplary embodiments of the present application.

Further, it can be understood that in the virtual scene, there may be some terrains, such as houses, hills, cliffs, etc. that cannot be directly walked over. Therefore, according to continuous changes of the virtual scene and a correspondence relationship between the motion area and the virtual scene, each sensor needs to add a three-dimensional coordinate parameter z on the basis of the two-dimensional coordinate system. The combination of this parameter and the two-dimensional coordinate in the two-dimensional coordinate system can be changed in real time according to the changes of the terrains in the virtual scene, thus forming a three-dimensional coordinate values (x, y, z) for each two-dimensional coordinate point, as shown in FIG. 9.

Figure 10:
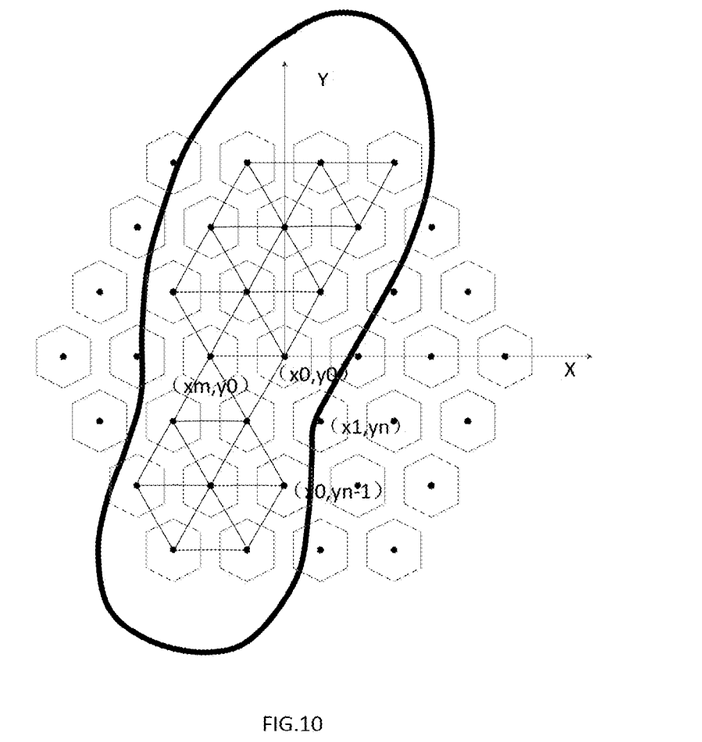
FIG. 10 is a view showing an example of calculating a barycenter coordinate through a triangular approximation algorithm according to some exemplary embodiments of the present application.

In specific implementation, when the user's feet stand on the motion area of the omni-directional running belt 1, a pressure sensor distribution area as shown in FIG. 10 will be generated in the motion area. In some exemplary embodiments of the present application, after the user stands on the motion area, a three-dimensional real-time coordinate system can be initialized according to the user's initial barycenter coordinate on the omni-directional running belt 1 and the virtual scene. The three-dimensional real-time coordinate system includes a correspondence relationship between actual coordinates (i.e., coordinates corresponding to each sensor on the omni-directional running belt 1, which includes three directions of x, y and z) and scene coordinates (i.e., coordinates in the virtual scene, which includes three directions of x, y and z). In some exemplary embodiments of the present application, initializing the three-dimensional real-time coordinate system specifically includes initializing the correspondence relationship between the actual coordinates and the scene coordinates in the three-dimensional real-time coordinate system.

In some exemplary embodiments, the initial barycenter coordinate of the user on the omni-directional running belt 1 may be determined in the following manner.

First, the pressure sensors in the area where the user's feet are located can be connected in the manner shown in FIG. 10 to divide the area into a plurality of triangles. Assuming that coordinates of three vertices of a triangle A are (x1, y1), (x2, y2), (x3, y3) respectively, a barycenter coordinate Gg1(Xg1, Yg1) of the triangle A can be determined according to the following formulas (1) and (2):

$$Xg1=(x1+x2+x3)/3 \tag{1}$$

$$Yg1=(y1+y2+y3)/3 \tag{2}$$

Then, according to formula (3), an area of the triangle A is determined.

$$S1=((x2-x1)*(y3-y1)-(x3-x1)*(y2-y1))/2 \tag{3}$$

Then the barycenter coordinate and the area of each triangle in the area where the user's feet are located are calculated by the above method, and finally initial barycenter coordinates of the feet are calculated respectively according to the above calculation results.

Specifically, assuming that the area where the user's left foot is located can be divided into m triangles, the initial barycenter coordinate Gg(Xg, Yg) of the left foot can be calculated according to formulas (4) and (5):

$$Xg = \frac{D\iint xdS}{S} = \frac{\sum_{i=1}^{m} XiSi}{\sum_{i=1}^{m} Si} \tag{4}$$

$$Yg = \frac{D\iint ydS}{S} = \frac{\sum_{i=1}^{m} YiSi}{\sum_{i=1}^{m} Si} \tag{5}$$

In the formulas, Xi is an x-axis coordinate value of an i-th triangle, Yi is a y-axis coordinate value of the i-th triangle, and Si is an area of the i-th triangle.

It should be noted that the calculation method of the initial barycenter coordinate of the user's right foot is the same as the calculation method of the initial barycenter coordinate of the left foot, and will not be repeated here.

In addition, in practical application, when determining the initial barycenter coordinate of the user on the omni-directional running belt by the above-mentioned method, as shown in FIG. 10, there may be a situation where one or two vertices of some triangles are not in the area where the foot is located. In order to improve the accuracy of determining the barycenter coordinate, in some exemplary embodiments of the present application, triangles with one or two vertices not in the area where the foot is located may be discarded, and the initial barycenter coordinates may be calculated only based on triangles with all three vertices in the area where the foot is located.

Therefore, the initial barycenter coordinate of the user on the omni-directional running belt 1 can be determined through the above triangular approximation algorithm, and then the correspondence relationship between the actual coordinates and the scene coordinates in the three-dimensional real-time coordinate system can be set according to the initial barycenter coordinate. For example, assuming that the initial barycenter coordinate of the user on the omni-directional running belt 1 is (Xg, Yg) and a scene coordinate of an area B on a flat ground in the virtual scene is (Xt, Yt), the coordinate (Xg, Yg) can be set to correspond to the scene coordinate (Xt, Yt) so that the user stands on the flat ground area B in the virtual scene.

It can be understood that since the actual number of sensors on the omni-directional running belt 1 is much larger than that shown in FIG. 10, the area of the region where the user's feet are located and the initial barycenter coordinate of the user calculated by the above-mentioned method are close to the real values, thus meeting the barycenter accuracy requirements.

Further, after initializing the three-dimensional real-time coordinate system in the above manner, the user's position and moving direction in the virtual scene can be determined according to the user's movement on the omni-directional running belt 1 when the user moves, and the correspondence relationship between the actual coordinates and the scene coordinates in the three-dimensional real-time coordinate system can be updated according to the user's movement.

Specifically, a movement state of the user can be determined according to pressure changes received by the pressure sensors corresponding to the barycenter coordinates of the user's feet, such as whether the user is walking or jumping, etc., and then the position and moving direction of the user in the virtual scene under different movement states can be determined. The barycenter coordinates of both feet during the user's movement can be determined according to the above-mentioned triangle approximation algorithm, which is not repeated here.

In some exemplary embodiments, if it is determined that the user first lifts the left foot or the right foot and then falls the left foot or the right foot according to the pressure changes received by the pressure sensors corresponding to the barycenter coordinates of the user's feet, then it can be determined that the user is walking, so that actual coordinates of starting points and falling points of the user's feet can be determined according to the pressure changes received by the pressure sensors corresponding to the barycenter coordinates of the user's feet. A walking direction and a walking distance of the user in the virtual scene are determined according to the actual coordinates of the starting points and the falling points of the user's feet and the correspondence relationship between the actual coordinates and the scene coordinates, and a walking speed of the user in the virtual scene is determined according to the walking distance and an time interval between the starting point and the falling point of each step.

Figure 11:
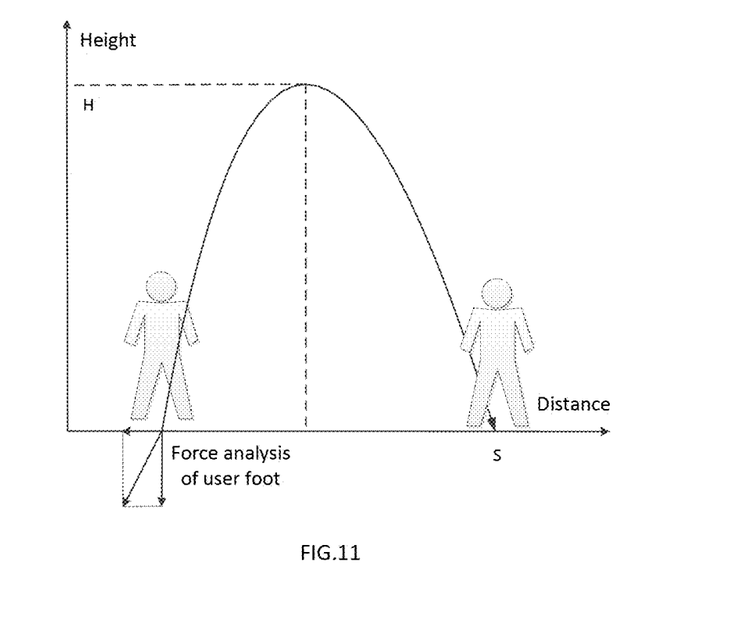
FIG. 11 is a schematic view of a relationship between a user jumping height and a horizontal displacement according to some exemplary embodiments of the present application.

In some exemplary embodiments, it may be determined that the user is jumping if the pressures received by the pressure sensors corresponding to the barycenter coordinates of the user's feet suddenly disappears simultaneously. When the user jumps, if there is an obstacle higher than a horizontal level at the scene coordinates in the virtual scene corresponding to the barycenter coordinates of the user's feet (the Z value of the actual coordinate corresponding to the obstacle is greater than 0), the user may jump over or jump on the obstacle in a jumping manner. At this time, the processor needs to judge whether a jumping height and horizontal displacement of the user meet requirements so as to judge whether the user can pass over the obstacle in the virtual scene.

Specifically, when the user stands on the omni-directional running belt 1, the processor can determine a mass or weight of the user according to the pressure values received by the pressure sensors corresponding to the barycenter coordinates of the user's feet, so that when the user jumps, the processor can determine a maximum pressure value F received by the pressure sensors according to the pressure changes received by the pressure sensors corresponding to the barycenter coordinates of the user's feet, and calculate an initial acceleration a of the user according to formula (6) based on the mass in of the user's body and the maximum pressure value F:

$$F = ma \tag{6}$$

Then, according to the time interval t between two adjacent landings of the user and the initial acceleration a, the jumping height h of the user is calculated according to formula (7):

$$H = \tfrac{1}{2} a t^2 \tag{7}$$

According to the left foot barycenter coordinate $G1(X_{g1}, Y_{g1})$ and right foot barycenter coordinate $G2(X_{g2}, Y_{g2})$ before the user's feet leave the ground, and the left foot barycenter coordinate $G1'(X_{g'1}, Y_{g'1})$ and the right foot barycenter coordinate $G2'(X_{g'2}, Y_{g'2})$ after landing, the horizontal displacement L of the user, that is, the jumping distance of the user, is determined according to formula (8):

$$L = \sqrt{\left(\frac{(X_{g1}+X_{g2})}{2} - \frac{(X_{g'1}+X_{g'2})}{2}\right)^2 + \left(\frac{(Y_{g1}+Y_{g2})}{2} - \frac{(Y_{g'1}+Y_{g'2})}{2}\right)^2} \tag{8}$$

It should be noted that the determined jumping height and horizontal displacement of the user are the actual jumping height and horizontal displacement of the user on the omni-directional running belt 1. In some exemplary embodiments of the present application, after determining the actual jumping height and horizontal displacement of the user, the jumping height and horizontal displacement of the user in the virtual scene can be determined according to the correspondence relationship between the actual coordinates and the scene coordinates, and then whether the jumping height and horizontal displacement are greater than the height and horizontal dimension of the obstacle in the virtual scene can be determined; if not, it can be determined that the user has not jumped over the obstacle, the horizontal displacement in the virtual scene can be zeroed, and the correspondence relationship between the scene coordinates and the actual coordinates can be updated.

In some exemplary embodiments, when the user jumps, if there is an obstacle lower than the horizontal level at the scene coordinates in the virtual scene corresponding to the barycenter coordinates of the user's feet (the Z value of the actual coordinate corresponding to the obstacle is less than 0), that is, there may be a river or ravine in front of the user in the virtual scene, and the user may jump over the obstacle in a jumping manner. At this time, the processor needs to determine whether the horizontal displacement of the user's jump meets the requirements so as to determine whether the user can pass over the obstacle in the virtual scene.

Specifically, if the Z value of the scene coordinate corresponding to the barycenter coordinate when the user lands on both feet is greater than or equal to 0, and there is no steep slope with a height exceeding a certain threshold in front of the user in the virtual scene, it can be determined that the user has passed over the obstacle, otherwise, it can be determined that the user has not passed over the obstacle.

It can be understood that when an obstacle with a height exceeding a certain threshold exists in front of the user in the virtual scene, and the user hasn't passed over the obstacle, if the user continues to move on the omni-directional running belt 1, the actual coordinates corresponding to the barycenter coordinates of the user's feet will continue to change, but the position of the user in the virtual scene will not change. At this time, the scene coordinate values of the X and Y axes of the user in the current scene can be given to the continuously changing actual coordinates of the user's feet in real time, while the height values of all sensors in front will remain unchanged, and the user is prompted to turn. If the user turns, the scene change is re-matched with the user's movement, thus realizing synchronous change of the actual coordinates at the user's feet and the scene coordinates. The threshold can be set according to the height that the user cannot normally pass over. For example, if the minimum height that the user cannot normally pass over is 0.5 meters, the threshold can be set to 0.5 meter.

In addition, it can be understood that when determining the barycenter coordinates of the user's feet in some exemplary embodiments of the present application, a certain error exists because the calculation is only based on triangles whose three vertices are all in the area where the user's feet are located. Therefore, when the user moves for a long time, especially when walking for a long distance in the same direction, the problem of error accumulation is likely to occur, resulting in inaccurate moving distance of the user determined by the processor.

In order to avoid inaccuracy of the determined moving distance of the user due to error accumulation, the application introduces a real-time error elimination mechanism. Specifically, when the motion device is turned on and initialized, a typical virtual scene, such as a flat ground scene, can be set, and the user is prompted to take a few steps on a trial basis, so that a corresponding error adjustment parameter is calculated according to the walking steps and speeds of the user in the trial walking process in the typical virtual scene, and further, in the motion process of the user, the distance the user moves in the virtual scene is adjusted according to the error adjustment parameter for each step, thereby eliminating accumulated errors.

Specifically, the distance that the user moves in each step can be adjusted by the following formula (9):

$$s=\sqrt{(x1-x0)^2+(y1-y0)^2}+\partial \qquad (9)$$

In the formula, s is the distance the user moves in a certain step in the virtual scene, $\partial$ is the error adjustment parameter, (x1, y1) is the falling point coordinate of the user in a certain step in the virtual scene, and (x0, y0) is the starting point coordinate of the user in a certain step in the virtual scene.

It can be understood that by calculating different error adjustment parameters according to different steps and speeds of different users in each typical virtual scene, and adjusting the jumping distances or walking distances in the corresponding scene according to the corresponding error adjustment parameters in the motion process of different users, the accumulated errors of different users in the motion process in corresponding virtual scenes can be eliminated pertinently, so that the determined moving distances of different users in the motion process in corresponding virtual scenes are more accurate.

According to the motion device for virtual reality interaction provided by some exemplary embodiments of the application, a plurality of running belt units are connected by grooves and elastic straps to form an omni-directional running belt, the omni-directional running belt is supported by a core, and a plurality of second balls are respectively arranged in a plurality of sockets in a surface of the core contacting the omni-directional running belt, so that a user can move in any direction on the motion device. The motion device has a simple structure and excellent actual operability. Moreover, by arranging a pressure sensor on one side of each running belt unit facing the core, creating a three-dimensional real-time coordinate system, and updating the three-dimensional real-time coordinate system in real time according to the movement of the user, a real-time correspondence relationship between relative position changes of the pressure sensors and the three-dimensional coordinate system in the virtual scene is realized, and finally the interactive process between the omni-directional running belt and a virtual reality device such as a computer is completed, which results a richer and more vivid user experience.

The virtual reality system provided by some exemplary embodiments of the present application aims to solve the technical problems that the virtual reality system in related art has poor user experience due to limited motion range of lower limbs of a user, and devices capable of realizing omni-directional motion experience have complex structure and poor actual operability. The virtual reality system includes the motion device for virtual reality interaction described in the above embodiments, hereinafter referred to as the motion device for short, and the virtual reality device.

The explanation of the structure and implementation principle of the motion device can refer to the detailed description of some exemplary embodiments described above, which will not be described in detail below.

The virtual reality device in some exemplary embodiments of the present application may be any device capable of displaying a virtual scene, such as computers, smart phones, wearable devices, head-mounted displays, etc.

In some exemplary embodiments, the motion device can sense the motion of the user through the omni-directional running belt included in the motion device, and generate motion data of the user in the manner described in some exemplary embodiments above, wherein the motion data can be at least one of walking distance, walking speed, walking direction, jumping height, initial acceleration and horizontal displacement of the user in a virtual scene, and then send the motion data of the user to the virtual reality device, so that the virtual reality device can adjust the virtual scene image according to the motion data of the user.

For example, assuming that in the current scene image displayed in the virtual reality device, the user is at position 1, and when the user moves on the omni-directional running belt, the motion device for virtual reality interaction determines that the user walked 1 meter in a direction A and moved to a position 2 in the virtual scene through the user motion sensed by the omni-directional running belt, then the motion direction and walking distance of the user can be transmitted to the virtual reality device, so that the virtual reality device can adjust the current virtual scene image to be the scene image of the user at position 2 according to the user motion data.

In addition, in order for the motion device to initialize the three-dimensional real-time coordinate system according to the user's initial barycenter coordinate and the virtual scene when the user stands on the omni-directional running belt, in some exemplary embodiments of the present application, the motion device can also send a message to the virtual reality device when the user stands on the omni-directional running belt, so that the virtual reality device can send an initially displayed virtual scene image to the motion device, so that the motion device initializes the three-dimensional real-time coordinate system according to the user's initial barycenter coordinate and the initially displayed virtual scene image.

The initially displayed virtual scene image can be set as required. For example, when the virtual reality system is used to play a game, the initially displayed virtual scene image may be an image of a virtual user in the game interface when the game starts. Alternatively, it may be a virtual scene image displayed at the time when the last game exited, etc.

It should be noted that in some of the above exemplary embodiments of the present application, it is exemplarily illustrated that the motion data of the user in the virtual scene is generated by the motion device according to the motion of the user. In actual application, after the omni-directional running belt senses the motion of the user, the motion device can also send the sensing result to the virtual reality device, so that the motion data of the user in the virtual scene is determined by the processor in the virtual reality device, and then the virtual scene image is adjusted.

The virtual reality system provided by some exemplary embodiments of the present application includes a virtual reality device and a motion device for virtual reality interaction. Through the interaction between the virtual reality device and the motion device for virtual reality interaction, the virtual scene image is synchronously displayed in the virtual reality device when the user moves on the motion device for virtual reality interaction, thus realizing the interaction between virtuality and reality.

In the description of this specification, the description referring to terms "one embodiment," "some embodiments," "examples," "specific examples," or "some examples" and the like means that a specific feature, structure, material, or characteristic described in connection with the embodiment or example is included in at least one embodiment or example of this application.

Furthermore, the terms "first" and "second" are used for descriptive purposes only and cannot be understood as indicating or implying relative importance or implicitly indicating the number of technical features indicated. Thus, features defined by "first" and "second" may explicitly or implicitly include at least one of the features.

Any process or method description in the flowchart or otherwise described herein can be understood as representing a module, segment, or portion of code including one or more executable instructions for implementing specific logical functions or steps of the process, and the scope of preferred embodiments of the present application includes additional implementations in which functions may be performed in an order other than that shown or discussed, including a substantially simultaneous manner or the reverse order according to the functions involved, which should be understood by those skilled in the art to which embodiments of the present application belong.

It should be understood that various parts of the present application may be implemented in hardware, software, firmware, or a combination thereof. In the above embodiments, the plurality of steps or methods may be implemented in software or firmware stored in a memory and executed by a suitable instruction execution system. For example, if implemented in hardware, as in another embodiment, it may be implemented by any one or a combination of the following technologies known in the art: discrete logic circuits having logic gates for implementing logic functions on data signals, application specific integrated circuits having appropriate combinational logic gates, programmable gate arrays (PGA), field programmable gate arrays (FPGA), etc.

One of ordinary skill in the art can understand that all or part of the steps carried by the method for implementing the above embodiment can be completed by instructing relevant hardware through a program, which can be stored in a computer readable storage medium, and the program, when executed, includes one or a combination of the steps of the method embodiments.

The storage medium mentioned above may be read-only memory, magnetic disk or optical disk, etc. Although the embodiments of the present application have been shown and described above, it is to be understood that the above-mentioned embodiments are exemplary and should not be construed as limiting the present application, and those of ordinary skill in the art may make changes, modifications, substitutions and variations to the above-mentioned embodiments within the scope of the present application.

The invention claimed is:

1. A motion device for a virtual reality interaction, comprising:
   a core;
   a running belt carried by the core, wherein the running belt is configured to wrap the core and capable of sliding on an outer surface of the core, the running belt comprises a plurality of running belt units, a surface of each running belt unit facing the core is provided with a plurality of grooves, and each groove of each running belt unit is connected with a corresponding groove of an adjacent running belt unit through an elastic strap; and
   a frame located at a periphery of the running belt and configured to carry the running belt and the core, wherein a plurality of first balls are arranged between the frame and the running belt.

2. The motion device for the virtual reality interaction according to claim 1, wherein the outer surface of the core is provided with a plurality of sockets, and a second ball different from the plurality of first balls is arranged in each socket.

3. The motion device for the virtual reality interaction according to claim 2, wherein the core is made of rigid material, each running belt unit is made of a light metal material, the elastic strap is a metal elastic strap, and the first balls and the second balls are both metal balls.

4. The motion device for the virtual reality interaction according to claim 2, wherein as to the plurality of sockets, connecting lines between centers of adjacent three sockets take on an equilateral triangular shape.

5. The motion device for the virtual reality interaction according to claim 2, wherein each socket has a sphere segment shape, and a height of the sphere segment is $4/5$ of a height of the sphere.

6. The motion device for the virtual reality interaction according to claim 2, wherein the frame comprises an oil supply pipeline and an oil supply head arranged therein, the oil supply pipeline is connected with an oil source, and the oil supply head is configured to supply oil to the plurality of sockets through a gap when the gap occurs between two adjacent running belt units.

7. The motion device for the virtual reality interaction according to claim 1, wherein a cross section of each running belt unit is hexagonal, and a corresponding groove is provided along a perpendicular bisector of each side of the hexagon.

8. The motion device for the virtual reality interaction according to claim 1, wherein the running belt is an omni-directional running belt, the plurality of running belt units comprise adjacent first and second running belt units, the first running belt unit has a first stop wall, each groove of the first running belt unit has a first slide rail, the second running belt unit has a second stop wall, each groove of the second running belt unit has a second slide rail, the elastic strap has a first T-shaped end and a second T-shaped end, the first T-shaped end is configured to slide in the first slide rail and stop at the first stop wall, and the second T-shaped end is configured to slide in the second slide rail and stop at the second stop wall.

9. The motion device for the virtual reality interaction according to claim 1, wherein the core is substantially ellipsoidal, and the ellipsoid has two opposite substantially planar main surfaces and an arc surface connecting the two main surfaces.

10. The motion device for the virtual reality interaction according to claim 9, wherein the frame is provided with a brush adjacent to an outer periphery of one of the main surfaces.

11. The motion device for the virtual reality interaction according to claim 1, wherein the surface of each running belt unit facing the core is further provided with a pressure sensor.

12. A virtual reality system comprising:
a virtual reality device comprising a receiver and a processor; and
a motion device for a virtual reality interaction comprising:
a core;
a running belt carried by the core, wherein the running belt is configured to wrap the core and capable of sliding on an outer surface of the core, the running belt comprises a plurality of running belt units, a surface of each running belt unit facing the core is provided with a plurality of grooves, each groove of each running belt unit is connected with a corresponding groove of an adjacent running belt unit through an elastic strap, and the surface of each running belt unit facing the core is further provided with a pressure sensor;
a frame located at a periphery of the running belt and configured to carry the running belt and the core, wherein a plurality of first balls are arranged between the frame and the running belt; and
a transmitter configured to transmit motion data of a user on the running belt to the receiver of the virtual reality device,
wherein the processor is configured to establish a two-dimensional coordinate system according to a distribution of pressure sensors of the running belt, and combine the two-dimensional coordinate system with a virtual scene to create a three-dimensional real-time coordinate system.

13. The virtual reality system according to claim 12, wherein the processor is further configured to:

initialize the three-dimensional real-time coordinate system according to an initial barycenter coordinate of the user on the running belt and the virtual scene, wherein the three-dimensional real-time coordinate system comprises a correspondence relationship between actual coordinates and scene coordinates; and
update the correspondence according to a movement of the user.

14. The virtual reality system according to claim 13, wherein the processor is further configured to:
determine actual coordinates of starting points and falling points of the user's feet according to pressure changes received by the pressure sensors corresponding to the barycenter coordinates of the user's feet when the user walks;
determine a walking distance of the user in the virtual scene according to the actual coordinates of the starting points and the falling points of the user's feet and the correspondence relationship between the actual coordinates and the scene coordinates; and
determine a walking speed of the user in the virtual scene according to a time interval between the starting point and the falling point and the walking distance.

15. The virtual reality system according to claim 14, wherein the processor is further configured to:
determine an initial acceleration according to pressure changes received by the pressure sensors corresponding to the barycenter coordinates of the user's feet and a weight of the user when the user jumps;
determine a jumping height of the user according to a time interval between two adjacent landings of the user and the initial acceleration;
determine a horizontal displacement of the user according to the barycenter coordinates of the user's feet before leaving the ground and the barycenter coordinates of the user's feet after landing.

16. The virtual reality system according to claim 15, wherein the processor is further configured to adjust the walking distance or the horizontal displacement according to an error adjustment parameter.

17. The virtual reality system according to claim 12, wherein the motion device for the virtual reality interaction is configured to:
sense the user's motion through the pressure sensors of the running belt and generates motion data; transmit the motion data of the user to the receiver of the virtual reality device through the transmitter;
wherein the virtual reality device is configured to:
process the motion data of the user received by the receiver through the processor;
display a virtual scene image; and
adjust the virtual scene image according to the processing of motion data by the processor.

18. The virtual reality system according to claim 17, wherein the motion data comprises at least one of a walking distance, a walking speed, a walking direction, a jumping height, an initial acceleration, or a horizontal displacement of the user in the virtual scene.

* * * * *